Sept. 1, 1942.  C. KIESSLING ET AL  2,294,620
ARRANGEMENT FOR THE DRIVE OF ROTARY PRINTING PRESSES
Filed May 27, 1939  2 Sheets-Sheet 1

Inventors.
Carl Kiessling
Aage Garde and
Nils J.E. Haglöf
Attorney.

Sept. 1, 1942.  C. KIESSLING ET AL  2,294,620
ARRANGEMENT FOR THE DRIVE OF ROTARY PRINTING PRESSES
Filed May 27, 1939  2 Sheets-Sheet 2

Inventors.
Carl Kiessling
Aage Garde and
Nils J. E. Haglöf.
per W. Wallace White
Attorney.

Patented Sept. 1, 1942

2,294,620

UNITED STATES PATENT OFFICE 2,294,620

ARRANGEMENT FOR THE DRIVE OF ROTARY PRINTING PRESSES

Carl Kiessling and Aage Garde, Vasteras, Sweden, and Nils J. E. Haglöf, Wanstead, London, England, assignors to Allmänna Svenska Elektriska Aktiebolaget, Vasteras, Sweden, a corporation of Sweden Application May 27, 1939, Serial No. 276,138
In Sweden April 25, 1938

3 Claims. (Cl. 270—20)

The present invention relates to a speed synchronizing system for rotary printing presses where the different elements or sections are individually driven by regulable motors but held in synchronism by means of asynchronous machines coupled to the different sections and interconnected on the rotor side. The invention has for its object to effect an automatic interconnection of the rotor circuits of the asynchronous machines when the presses are in the right mutual position and to obtain the low speed necessary for this interconnection. According to the invention the driving motors for the different press sections are regulated each by its rapid regulator. Such regulators, however, function in different manners so that one of the sections for instance the folder, serves as a master machine and is regulated to a constant speed, whereas the other sections are regulated with respect to the current between the rotor circuit of the asynchronous machine coupled to that section and the rotor circuit of the asynchronous machine coupled to the master machine. According to the invention the different sections are further held together by means of interconnected asynchronous motors directly coupled to the driving motors or at least running with a speed higher than that of the printing cylinders whereas the latter ones are coupled to the above mentioned asynchronous machines which are double-pole machines and only have for its object to indicate the right mutual position of the printing cylinders, and when this position is reached allow an interconnection of the rotor circuits of the asynchronous machines directly coupled with the driving motors or presses.

Figure 1:
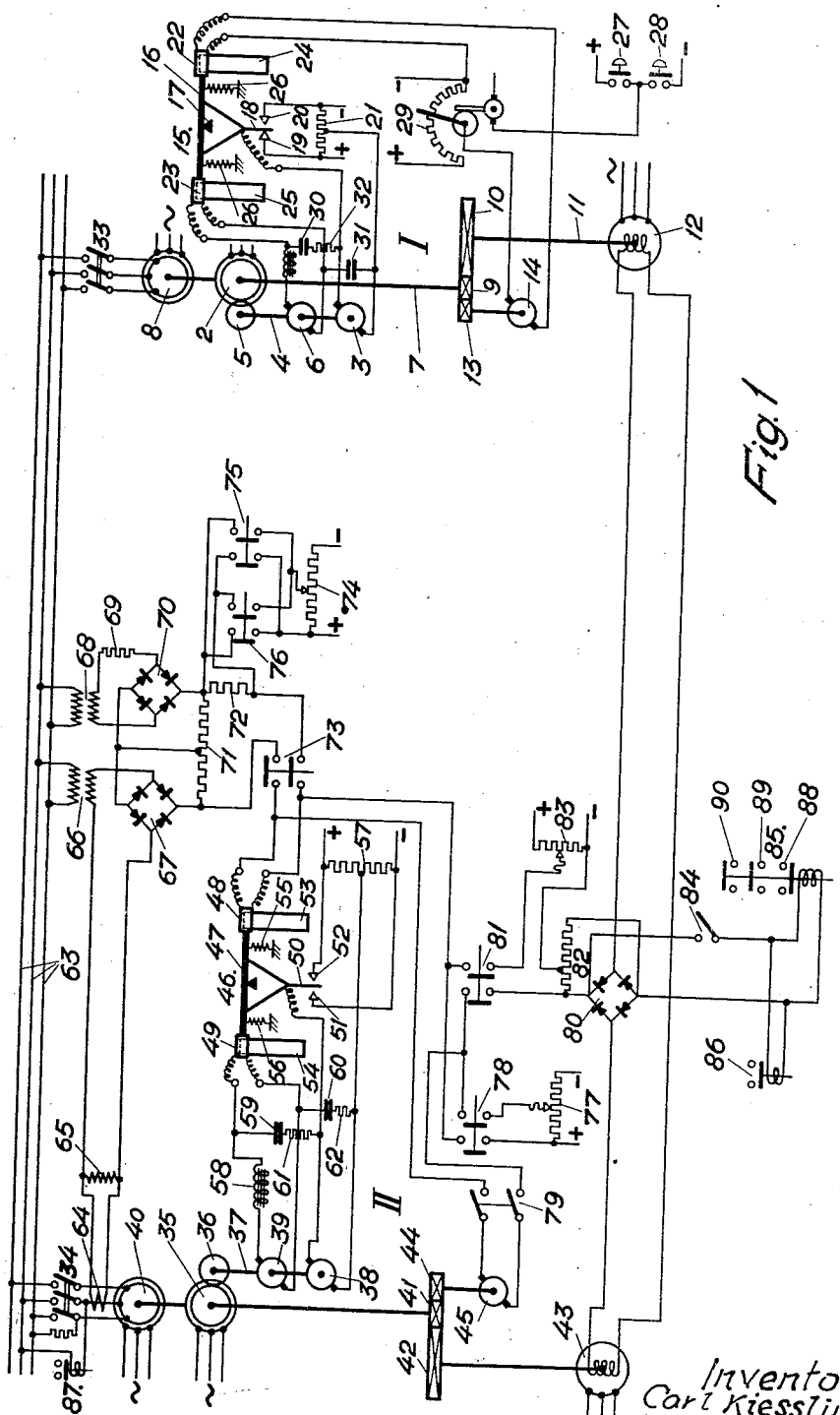
Figure 2:
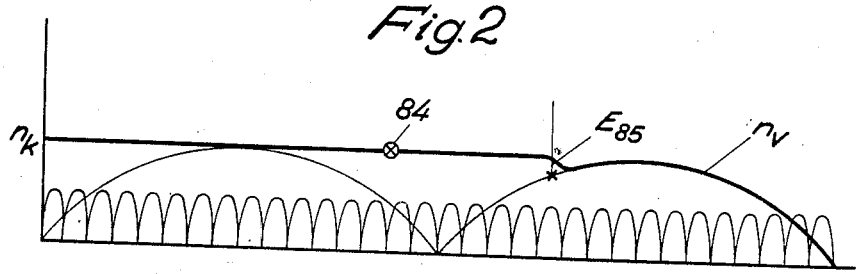
Figure 3:
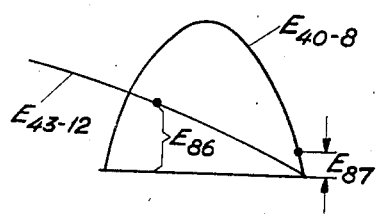

The invention is most easily understood by reference to the accompanying drawings where Fig. 1 shows a diagram of connection for the arrangement according to the invention; Fig. 2 is a diagram which shows the operation of the synchronisation and Fig. 3 illustrates the synchronization on a larger scale. In Fig. 1, I designates the master machine and II the other printing press sections. The driving motor of the master machine is designated by 2 and is supposed to comprise a three-phase commutator motor with speed regulation by brush displacement. 3 is the brush displacement motor which, through the medium of the shaft 4, acts on a pinion 5 in mesh with the tooth rim of the brush bridge on the three-phase commutator motor. 6 is a small direct current generator attached on the said shaft 4 and it has for its object to give the necessary recalling. The driving motor 2 is, through the medium of the shaft 7, coupled partly with the asynchronous machine 8 necessary for the synchronous drive with the other sections and partly with a pinion 9 engaging the tooth wheel 10 on the shaft 11 of the printing cylinder. On this shaft 11 there is also attached an asynchronous machine 12 hereinafter referred to as a synchronism indicator which consists of a small double-pole asynchronous machine. The pinion 9 also engages a tooth wheel 13, the shaft of which is coupled with a tachometer generator 14. The speed of the motor 2 is regulated by means of the rapid regulator 15 which consists of a balance 16 pivoted on an edge 17. The balance 16 is provided with an arm 18 swinging between two contacts 19 and 20 which are connected with a potentiometer resistance 21, which is in turn connected with a direct current source. The middle point of this potentiometer resistance 21 is connected with one pole of the brush displacement motor 3 while the other pole of this motor is connected with the arm 18 or with the contacts attached on this arm and coacting with the contacts 19 and 20. The balance 16 carries two coils 22 and 23 of which 22 is the feeling coil and 23 the so called recalling coil. These two coils move in the air gaps of the magnets 24 and 25. The balance 16 is held in balance by means of two helical springs 26. The feeling coil 22 is, through the medium of a potentiometer resistance 29, operated by the push buttons 27 and 28 which are suitably connected with the tachometer generator 14 so that by means of these push buttons 27 and 28 an increase or decrease of the speed of the motor 2 can be obtained. The recalling coil 23 is connected to the recalling generator 6 but is also connected over the condensers 30 and 31 and the resistance 32 to the terminals of the regulating motor 3. 33 is a contactor which has for its object to cause a connection of the asynchronous machine 8 with the interconnections between the other asynchronous machines of the system.

Each of the sections belonging to the system is provided with an equipment corresponding to that shown to the left on the figure and designated by II. The driving motor consists here of a three-phase commutator motor with speed regulation by brush displacement which is designated by 35. In mesh with the tooth rim of the brush bridge of this motor there is a pinion 36 which, through the medium of a shaft 37, is connected with the brush displacement motor 38, and on the same shaft 37 the recalling generator 39 is attached. On the shaft of the motor 35 the asynchronous machine 40 is attached and also attached to said shaft is a pinion 41 which meshes with the tooth wheel 42 the shaft of which is coupled with the printing cylinder. In this section and on this shaft the double-pole asynchronous machine 43 is also attached. The said pinion 41 is also in mesh with the tooth wheel 44 on the shaft of which the tachometer generator 45 is attached. The rapid regulator is similar to the regulator 15 described above and is designated by 46. It has thus a balance 47 which carries a feeling coil 48, a recalling coil 49, and an arm 50 which latter swings between the two contacts 51 and 52. The coils 48 and 49 move in the air gaps of the two magnets 53 and 54 and in the same manner as described in connection with the above mentioned regulator 15, the balance is actuated by two helical springs 55 and 56 which tend to hold the balance in the horizontal position. Through the contacts 51 and 52 and the arm 50 current is fed to the brush displacement motor 38 from the potentiometer 57 so that the motor runs in one or the other direction according to whether the arm 50 is in contact with the contact 51 or 52. The other terminal of the motor 38 is connected with the middle point of the potentiometer 57. The recalling coil 49 is, in the same manner as above described, connected with the recalling generator 39, through the medium of an inductance coil 58 but also through the medium of the condensers 59 and 60 and the resistances 61 and 62, with the terminals of the motor 38. 34 is a contactor which has for its purpose to connect the asynchronous machine 40 with the line 63. In one of the phases from the asynchronous machine 40 there is inserted a current transformer 64 which is connected with the resistance 65 and this resistance is in series with the secondary winding of a voltage transformer 66 connected with a rectifier bridge 67. The primary winding of the said transformer 66 is connected with two of the phases of the line 63 and to the same phases a voltage transformer 68 is also connected, the secondary winding of which transformer is connected to another rectifier bridge 70 through a resistance 69. One of the direct current terminals of each of these two rectifier bridges is connected with the middle point of the resistance 71, and the two ends of this resistance are connected with the remaining two direct current terminals of the rectifier bridges. The feeling coil 48 of the regulator 46 can be connected, through the switch 73, to the resistance 71, and to the voltage drop over the resistance 71 a positive or negative voltage drop of the resistance 72 can be added, which resistance can be connected to the potentiometer 74 over the circuit breakers 75 and 76 for the purpose described below.

The feeling coil 48 can alternatively be connected to the tachometer generator 45 in series with the potentiometer 77 through the switches 78 and 79 or in series with a rectifier bridge 80 through the switch 81. The connection of the rectifier bridge 80 takes place through the potentiometer 82 and in series with a direct current voltage from the bridge 80 a voltage from the potentiometer 83 is fed to the coil for the purpose mentioned below. The rectifier bridge 80 is inserted in series between the rotor circuits of the two asynchronous machines 12 and 43. 85 is a maximum voltage relay the coil of which is being connected to the rectifier bridge 80 and to the same bridge a minimum voltage relay 86 is also connected. The relay 85 has three working contacts of which the contacts 88 are suitably inserted in the exciting circuit of the switch or relay 78, the working contacts 89 are suitably inserted in the exciting circuit of the switch 81 whereas the contacts 90 are suitably coupled in series with the working contacts of the minimum voltage relay 86 and suitably coupled in series with the minimum voltage relay 87 connected to the line 63. 84 is a hand operated switch by means of which the relays 85 and 86 can be connected to the rectifier bridge 80 at the moment desired, i. e. when synchronizing. The synchronizing of the different sections takes place in the following manner. The folder is assumed to be at a standstill and the section to be synchronized with it is started with a creeping speed which is determined by a voltage over the resistance 77 counteracting the voltage of the tachometer generator 45. When the section II has thus reached the creeping speed i. e. the speed which in Fig. 2 is designated by $n_k$, the synchronizing can take place and the operation is started by closing the switch 84 which moment also is indicated by the corresponding number—84—on the diagram Fig. 2. When closing the switch 84 the coil of the relay 85 is coupled to the rectifier bridge 80 and when the voltage over this bridge has reached a certain value designated by $E85$ in the diagram Fig. 2 the working contacts 88 are opened and simultaneously the contacts 89 and 90 are closed. When the working contacts 88 are opened the potentiometer resistance 77 is disconnected thereby that the switch 78 is opened and as the contacts 89 then are simultaneously closed, the switch 81 becomes closed and by this the voltage drop over the potentiometer 82 is inserted counteracting the voltage of the tachometer generator 45. The regulator 46 will thus regulate the motor 35 to a variable speed which is proportional to the voltage difference between the two asynchronous machines (synchronous indicators) 12 and 43. This speed is in the diagram Fig. 2 designated by $n_v$. In the same degree as the machines 12 and 43 approach in phases with each other the speed of the motor 35 decreases along the curve $n_v$ and if nothing occurs the machine 35 comes to a standstill when the asynchronous machine 43 is in phase with the asynchronous machine 12. In order to avoid the risk of the machine 2 being stopped before the synchronism has been perfected a small additional voltage is inserted in series with the tachometer generator 45, said additional voltage coming from the potentiometer resistance 83. The machine 2 thus passes at a very low speed through the position for synchronism between the two machines 12 and 43. This is of a very great importance since, as the passage through the position for synchronism takes place with a very low speed, the synchronisation can take place with an extraordinary precision just at the moment when the two machines 12 and 43 and the machines 8 and 40 are in synchronism. The synchronisation is in Fig. 3 illustrated in a larger scale where $E40-8$ represents the voltage difference between the two asynchronous machines 8 and 40 and $E43-12$ between the two asynchronous machines 43 and 12. When the voltage $E43-12$ has decreased to the value $E86$, the relay 86 is closed and when afterwards the voltage $E40-8$ has decreased to the value $E87$, the contacts of the relay 87 are also closed. When the working contacts of the relays 86 and 87 are closed a circuit for the contactor 34 is closed through the contacts 90 in the relay 85 and the synchronisation is completed in the moment when the two asynchronous motors 12 and 43 reach the position for synchronism, and at the same time the machines 8 and 40 also reach this position. The working contacts 90 of the relay 85 are so arranged as to prevent the synchronisation from taking place before the machine 2 has been sufficiently reduced in speed for a satisfactory synchronisation. The relay 85, must, therefore, be such that it remains closed in spite of the fact that the voltage difference over the rectifier bridge 89 decreases to zero.

When the different sections of the press have been coupled together the speed of the press is regulated in the following manner:

By actuating the push buttons 27 and 28 the potentiometer resistance 29 is operated and the voltage drop over this potentiometer resistance is in series with the tachometer generator 14 connected to the feeling coil 22 of the regulator 15.

The other sections of the press are regulated by their regulators, the feeling coils 48 of which are being connected to the rectifier bridges 67 and 70 and the regulation of the brush position of the different driving motors is then so performed that the equalisation current between the rotor circuit of the asynchronous machines coupled to the driving motors becomes zero. By this it is insured that each driving motor drives its section without the aid of the asynchronous machines which has for its purpose to maintain the synchronism also for sudden changes in the load.

For regulating the speed of the press mentioned above the push buttons 27 and 28 are used, which buttons act on the motor operated resistance 29. In order to get a simultaneous motion of the brush bridges of all motors it is, however, necessary to feed a positive or negative voltage impulse to the feeling coils of the regulators because any voltage impulse can not go out from the rectifier bridges 67 and 70 before the occurrence of a change in the angle between the different sections. For this purpose the regulator coil 48 is connected to the resistance 71 over the resistance 72, which receives a voltage over the switches 75 and 76, which switches in turn are closed when the push buttons 27 and 28 are pressed. For the regulation at creeping speed the tachometer generator 45 is coupled in series with the resistance 77 to the regulator coil 48 and simultaneously the rectifier bridges 67 and 70 are coupled to the regulator coil. The speed of the machine 35 will thus be determined by the tachometer generator 45 and the voltage drop over the potentiometer resistance 77 and by an equalisation current, which may pass through the line 63 the speed being so regulated that this equalisation current becomes zero or very small.

In spite of the fact that the invention is described in connection with a synchronizing device for printing presses it can, however, be applied in all cases where a regulation of the speed of a machine in dependence of a position is desired. So for instance the invention may be used for such a regulation of lift motors that the speed of the lift automatically approaches zero when the lift approaches the stop level.

We claim as our invention:

1. A speed synchronizing system for at least two machines comprising a driving motor for each machine, a tachometer generator and an asynchronous motor for each driving motor and adapted to be driven thereby, one asynchronous motor being a double pole motor, and means for regulating the speed of one driving motor in response to the voltage difference between its tachometer generator and the voltage difference between the asynchronous motors.

2. A speed synchronizing system for two machines comprising a driving motor for each machine, an asynchronous motor including a rotor circuit for each driving motor and adapted to be driven thereby, means for interconnecting the rotor circuits of said asynchronous motors, a tachometer generator coupled to each motor, a double pole asynchronous motor including a rotor circuit coupled to each said driving motor, a rectifier bridge, means for interconnecting over said rectifier bridge, the rotor circuits of said double pole motor, and means for regulating each driving motor in response to the voltage difference between the tachometer generator of one machine and the rectifier bridge.

3. In combination with the printing roll sections and the folding section of a rotary printing press, a speed synchronizing system for the sections comprising a driving motor for each section, a tachometer generator coupled to each driving motor, an asynchronous motor coupled to each section, means interconnecting the rotor circuits of the asynchronous motors, a speed regulator for each driving motor, and means for actuating the speed regulators in response to voltage changes between the tachometer generators and the asynchronous motors, respectively of two sections, whereby the speed regulators are actuated to synchronize the sections.

AAGE GARDE.
CARL KIESSLING.
NILS J. E. HAGLÖF.